Feb. 28, 1939.  C. J. KETTLER  2,149,092
SATURABLE CORE DETECTOR
Filed March 26, 1938
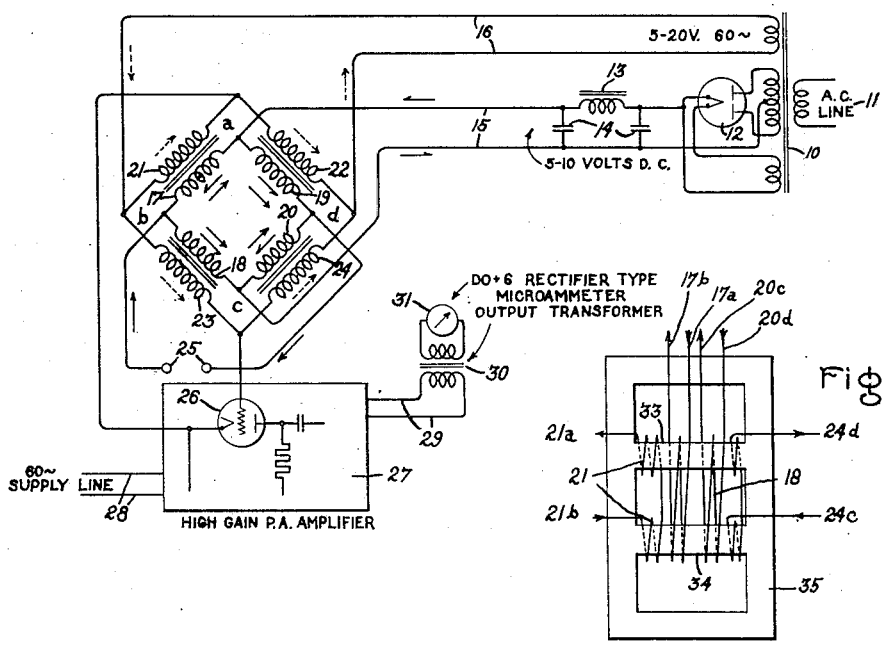
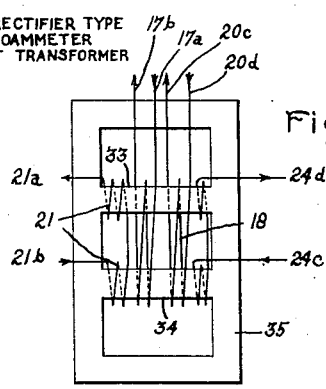
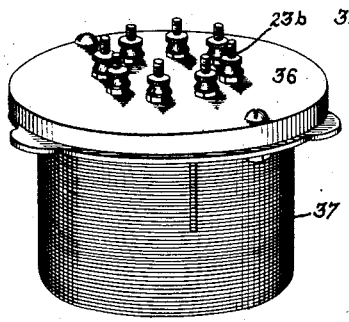
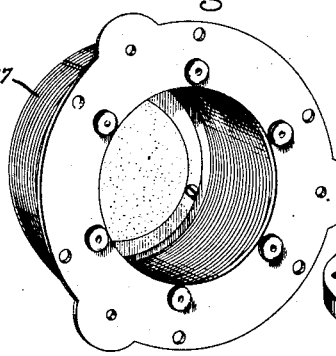
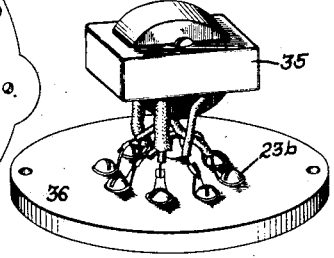
Inventor:
Clarence J. Kettler,
by Harry E. Dunham
His Attorney.

Patented Feb. 28, 1939

2,149,092

UNITED STATES PATENT OFFICE 2,149,092

SATURABLE CORE DETECTOR

Clarence J. Kettler, Pittsfield, Mass., assignor to General Electric Company, a corporation of New York Application March 26, 1938, Serial No. 198,280

8 Claims. (Cl. 175—183)

My invention relates to apparatus for detecting small direct current voltages such, for example, as the unbalance of a direct current measuring bridge and its object is to provide a rugged yet sensitive detector for such voltages that may take the place of the delicate galvanometer which is generally used for such purposes. The galvanometer detector is suitable for laboratory work. However, the sensitive galvanometer is not very satisfactory as a part of a portable measuring set and the detector of my invention being relatively small and rugged and also highly sensitive is more suitable where the measuring apparatus is to be carried about outside of the laboratory and used in places where there may be considerable vibration, dust conditions, variations in temperature, etc.

In carrying my invention into effect, I employ a compact, saturable core reactor bridge provided with direct current and alternating exciting current windings connected in bridge circuits with provisions for connecting the D. C. voltage to be detected across the direct current bridge circuit thereof in a manner such that the presence of minute direct current voltages to be detected upsets the balance of the alternating current bridge circuit and produces an alternating current voltage across the alternating current bridge circuit having a magnitude and phase angle proportional to the magnitude and polarity respectively of the direct current voltage to be detected. This alternating current voltage can be amplified and measured by a small rugged instrument calibrated in terms of the D. C. voltage unbalance. Opposite arms of the reactor bridge are electrically and magnetically similar in performance such that one magnetic core structure can be used for both such arms.

The features of my invention which are believed to be novel and patentable will be pointed out in the claims appended hereto. For a better understanding of my invention, reference is made in the following description to the accompanying drawing in which Fig. 1 is a diagrammatic showing of my reactance detector and its circuit connections, Fig. 2 illustrates schematically the preferred way of building a double reactor element in a compact form. Fig. 3 illustrates a reactor element and its terminal board, Fig. 4 illustrates a magnetic shield casing structure for the reactor element of Fig. 3 and Fig. 5 shows the assembly of the parts of Figs. 3 and 4.

Referring now to Fig. 1, at the upper right I have shown a convenient way of obtaining the necessary alternating and direct current supply of the proper voltage for my detector apparatus. 10 is a transformer supplied from a commercial source 11. The transformer feeds rectifier equipment 12. The rectified current is smoothed by a reactance 13 and condensers 14 and thus a low voltage source of direct current supply is available on the lines 15. The transformer also supplies a low voltage A. C. circuit 16. The voltage ranges indicated on the drawing for these supply circuits are those which I have found best suited for the purposes of the present invention. It will be evident that any variation in the voltage of supply line 11 will influence the voltages on both supply circuits 15 and 16 proportionately and it is only necessary to see that the one A. C. supply voltage to transformer 10 is maintained reasonably constant. However, small voltage variations do not impair the accuracy of operation of my detector as will be evident from the description to follow. The D. C. lines 15 supply direct current to a bridge circuit comprising the windings 17, 18, 19 and 20 and the A. C. lines 16 feed a bridge circuit comprising the windings 21, 22, 23 and 24. The A. C. and D. C. windings are wound in pairs on core parts each of which constitutes a saturable core reactor, and the combination may be considered a saturable core reactor bridge. The D. C. current causes partial saturation of the core material and this reduces the effective reactance of the A. C. bridge circuit. It will be noted that whereas the D. C. voltage is supplied at the upper and lower corners of the reactor bridge, the A. C. voltage is supplied at the side corners of the bridge as pictured in Fig. 1. The direction of steady D. C. saturating current from lines 15 may be represented by the full line single spiked arrows adjacent the D. C. windings and the direction of alternating current flow from lines 16 at a given instant may be represented by the dotted line double spiked arrows adjacent the A. C. windings. The direct current voltage to be detected or measured is connected to terminals 25 and impressed across the D. C. bridge circuit as indicated and the direct current flow due to this unknown voltage may be indicated by the full line double spiked arrows. Any resulting A. C. voltage that appears across the A. C. bridge circuit is impressed between the cathode and grid of a three-electrode amplifying tube 26 which may comprise one of several stages of amplification obtained by a high gain power amplifier 27 supplied with alternating current at 28 and having an output circuit at 29. Various arrangements of the amplifier may be used at 27 and it is not intended to confine the invention to any specific arrangement in this respect.

The current in the output circuit 29 is fed through a suitable transformer 30 to a rectifier type microammeter 31. In the operation of this bridge it is assumed that the bridge is balanced when the direct current voltage on terminals 25 is zero. Under these conditions the A. C. voltage impressed on the amplifier will be zero, and instrument 31 will indicate zero. If now a D. C. voltage of the polarity indicated by the full line double spiked arrows be applied at 25 opposite windings 18 and 19 of the bridge will increase the saturation of their cores and opposite windings 17 and 20 will decrease the saturation of their cores. The bridge will thus become unbalanced and an A. C. voltage will appear across the amplifier 26 which will be indicated by a corresponding reading on the instrument 31.

If a D. C. voltage of reversed polarity be applied at 25 the D. C. currents would add in windings 17 and 20 and subtract in windings 18 and 19 to unbalance the bridge. Thus the scheme may be used to detect very small direct current voltages in a reliable manner. It will be evident that reversing the polarity of the unknown D. C. voltage at 25 shifts the phase angle of the A. C. voltage applied on the amplifier. If it is desired to indicate the polarity as well as the magnitude of the D. C. voltage at 25, then a tube arrangement which is responsive to the phase shift of the A. C. voltage applied thereto may be employed at 27. One such arrangement is shown in connection with tubes 47 and 48, Fig. 5 of United States Letters Patent No. 1,825,514, Sept. 29, 1931, to Fitzgerald, assigned to the same assignee as the present invention.

The rectifier bridge shown in Fig. 1 may be built up of two double reactor units each wound as shown in Fig. 2 and having a finished appearance, as shown in Figs. 3, 4, and 5. The double reactor of Fig. 2 comprises two reactor legs which are opposite each other in the square of Fig. 1 and I will assume that Fig. 2 represents the legs on which D. C. coils 17 and 20 are wound in Fig. 1.

The A. C. coils are all similar, the D. C. coils are all similar, and the magnetic core parts are all similar. In order to identify the coils of Fig. 1 on the double reactor unit of Fig. 2, let the letters, $a$, $b$, $c$, and $d$ in Fig. 1 designate the winding ends which terminate adjacent these designations. Then in Fig. 2, 17$a$ designates the upper terminal of winding 17 in Fig. 1, 17$b$ the lower terminal of winding 17, 20$d$ the upper terminal of winding 20, etc.

It is seen that the D. C. windings 17 and 20 comprise coils wound about both middle legs 33 and 34 of the 4-legged closed core 35 and that the A. C. windings 21 and 24 are each made up of two coils, one about leg 33 and the other about leg 34. The A. C. flux of coil 21 is in series through the center legs of the core and adds with A. C. flux of A. C. coil 24. The D. C. excitation flux of coil 17 is in parallel in the two center legs of the core and has a return path in parallel in the end legs of the core and adds with the excitation flux of D. C. coil 20. If now a D. C. current from the unknown voltage source terminals 25 flows in coils 17 and 20 in the direction indicated in Fig. 1, it will reduce the D. C. saturation of the core structure shown in Fig. 2. At the same time if another similar double core structure be made for the other two opposite legs and its coils be connected up according to the same procedure following the connections of Fig. 1, the D. C. saturation thereof will be increased by such unknown current flow, from which it becomes evident that the reactor bridge structure of Fig. 1 can be made of two double reactors such as is shown in Fig. 2. This provides a convenient compact and efficient reactor arrangement in which the core material to be saturated is reduced to a minimum. I thus take advantage of the fact that since the behavior of opposite legs of the bridge are the same, they may be combined in a single reactor structure. The core material used is preferably a high permeability nickle-iron alloy such as is described in United States patent to Elmen No. 1,586,884, June 1, 1926.

These double reactor units, as manufactured and assembled with a terminal board 36 have the appearance seen in Fig. 3. They are then housed in a cylindrical laminated magnetic shield 37 such as is shown in Fig. 4 and the completed unit then appears as in Fig. 5. Two such units such as are shown in Fig. 5 make up the reactor bridge.

It is seen that the apparatus is rugged, yet not bulky, and has no delicate moving parts. The D. C. bridge circuit is completely isolated from the D. C. detector by the insulation resistance between the coils of the reactor assembly. The A. C. and D. C. excitation need not be critically fixed and, as shown, the apparatus may be entirely A. C. operated, thus avoiding the use of storage batteries. The apparatus is of a character that may be carried about and used under conditions where a galvanometer of corresponding sensitivity would not be at all practicable.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:—

1. A saturable reactance measurement bridge comprising an alternating current bridge circuit having four arms comprising coils wound on magnetic material, a direct current bridge circuit also having four arms comprising coils wound on the same magnetic material whereby the A. C. and D. C. arms of the bridge circuits are inductively related, means for supplying an operating direct current to the D. C. bridge circuit to partially and uniformly saturate the magnetic material in all arms of the bridge, means for supplying an operating alternating current to the A. C. bridge circuit, said D. C. and A. C. operating currents being supplied to said bridge circuits at points therein such that the A. C. bridge circuit is balanced, and means for supplying additional direct current to the D. C. bridge circuit at points therein which causes a non-uniform saturation of the magnetic material in different arms of the bridge circuits and an unbalance of the A. C. bridge circuit and means connected across the A. C. bridge circuit for detecting such unbalance.

2. Apparatus for detecting the presence of D. C. voltages comprising a D. C. bridge circuit having four similar arms comprising coils wound on magnetic material, an A. C. bridge circuit having four similar coils wound on the magnetic material in inductive relation with the four D. C. bridge coils, means for exciting the A. C. bridge circuit with alternating current, means for exciting the D. C. bridge circuit with direct current of such value as to partially saturate the core material, the A. C. and D. C. excitation being supplied at alternate corners of the combined bridge circuits, said A. C. bridge being balanced under the above conditions, means for impressing a D. C. voltage to be detected across the D. C. bridge circuit to cause an unbalance of the A. C. bridge circuit, and means connected across the A. C. bridge circuit for detecting any unbalance thereof.

3. A reactance bridge structure comprising a pair of double core reactor units, each unit comprising a core having side members connected by four legs with two A. C. coils wound on the two middle legs so as to produce an A. C. flux in series in the two legs and two D. C. coils wound about the middle two legs to produce fluxes in parallel in said two legs, the four D. C. coils of the two units being connected in a bridge circuit, and the four A. C. coils of the two units being connected in a different bridge circuit, one of said double core reactor units comprising opposite legs of the reactance bridge and the remaining double core reactor unit comprising the remaining two opposite legs of such reactance bridge.

4. A reactance bridge for detecting D. C. voltages, comprising a direct current four arm bridge circuit and an alternating current four arm bridge circuit, all of said bridge arms comprising coils wound on magnetic material and all arms of said reactance bridge being electrically and magnetically similar, means for impressing a D. C. voltage to be detected across the D. C. bridge circuit, such voltage causing a similar increase in magnetic saturation of opposite bridge arms, and a similar decrease in magnetic saturation in the remaining opposite bridge arms to produce an unbalance of the A. C. bridge circuit, the A. C. and D. C. coils which comprise opposite arms of the bridge circuits being wound on the same magnetic material.

5. A reactance bridge comprising eight coils and two magnetic cores, four of said coils being connected in a D. C. bridge circuit and the other four coils being connected in a different A. C. bridge circuit, opposite pairs of coils in each bridge circuit being wound on one core and the remaining pair of coils of each bridge circuit being wound on the other core, means for exciting said A. C. and D. C. bridge circuits with A. C. and D. C. respectively, such D. C. excitation causing similar magnetic saturation of both cores and a balance of the A. C. bridge circuit and terminals for impressing a D. C. voltage to be detected across said D. C. bridge circuit, such voltage increasing the saturation of one core and decreasing the saturation of the other core to unbalance the A. C. bridge circuit.

6. A reactance bridge for detecting D. C. voltages comprising a pair of magnetic core units, a D. C. bridge circuit having arms comprising coils, opposite coil arms of said circuit being wound on one core and the other opposite coil arm being wound on the remaining core, an A. C. bridge circuit having coil arms also with the opposite coil arms wound in pairs on the two magnetic cores, means for exciting the D. C. bridge circuit with direct current to similarly and partially saturate said cores, such saturation producing similar reactance changes in all arms of the A. C. bridge circuit, means for exciting said A. C. bridge circuit with alternating current, said A. C. bridge circuit being balanced under the above named conditions which balance is maintained irrespective of minor variations in either the A. C. or D. C. excitation, terminals for impressing a D. C. voltage to be detected across the D. C. bridge circuit, such voltage increasing the saturation of one core and decreasing the saturation of the other core to unbalance the A. C. bridge circuit, and means for detecting such unbalance.

7. In a reactance bridge, a double core reactor unit comprising opposite arms of such reactance bridge, said unit comprising a magnetic core structure having four parallel legs joined at their ends, a pair of A. C. coils wound on the two middle legs to produce an A. C. flux in series through said two legs and a pair of D. C. coils wound about the two middle legs to produce a D. C. flux in parallel in said two legs, said D. C. coils serving to vary the saturation of said two middle legs and the effective reactance of said A. C. coils.

8. Apparatus for detecting direct current voltages comprising a reactance bridge having four arms each consisting of magnetic core material provided with A. C. and D. C. windings, the A. C. windings being connected in a bridge circuit and the D. C. windings being connected in another bridge circuit, means for supplying the A. C. and D. C. bridge circuits with alternating current and direct currents respectively, the D. C. supply being connected to two opposite corners of the reactance bridge and the A. C. supply being connected to the remaining opposite corners of the reactance bridge, connections to impress an unknown voltage across the D. C. bridge circuit and means for detecting an unbalance condition across the A. C. bridge circuit.

CLARENCE J. KETTLER.